(12) United States Patent
Numrich et al.

(10) Patent No.: US 6,420,033 B1
(45) Date of Patent: Jul. 16, 2002

(54) METHODS FOR THE PRODUCTION OF FILMS

(75) Inventors: Uwe Numrich, Weiterstadt; Bernhard Schaefer, Darmstadt, both of (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 09/225,453

(22) Filed: Jan. 6, 1999

(30) Foreign Application Priority Data

Dec. 22, 1998 (DE) .......................................... 198 59 393

(51) Int. Cl.[7] .................... B32B 27/00; B32B 27/30; B32B 31/30
(52) U.S. Cl. ................ 428/421; 428/522; 525/199; 264/211.12
(58) Field of Search ................ 428/421, 422, 428/522; 525/199, 200, 227; 264/211.12

(56) References Cited

U.S. PATENT DOCUMENTS

| | | | |
|---|---|---|---|
| 3,253,060 A | * 5/1966 | Koblitz et al. | 525/199 |
| 3,458,391 A | * 7/1969 | Miller, Jr. | 525/199 |
| 4,317,860 A | 3/1982 | Strassel | 428/421 |
| 4,444,826 A | 4/1984 | Sasaki et al. | 428/216 |
| 4,860,509 A | * 8/1989 | Laaly et al. | 52/173 R |
| 5,256,472 A | 10/1993 | Moriya et al. | 428/215 |

FOREIGN PATENT DOCUMENTS

| | | |
|---|---|---|
| EP | 0 386 711 | 9/1990 |
| JP | 02-052720 | 2/1990 |
| JP | 03-110121 | 5/1991 |
| WO | WO 96/40480 | 12/1996 |

* cited by examiner

*Primary Examiner*—Paul Thibodeau
*Assistant Examiner*—Ramsey Zacharia
(74) *Attorney, Agent, or Firm*—Oblon, Spivak, McClelland, Maier & Neustadt, P.C.

(57) ABSTRACT

A film comprising at least one layer of fluorine polymers and poly(meth)acrylates is prepared by (i) preparing a mixture of fluorine polymer and poly(meth)acrylate; and (ii) extruding the mixture maintained below its gel-forming temperature through the die of an extruder having a filter placed before entry of the mixture into the die, the temperature of the die being maintained higher than the temperature of the composition upon entry into the die but lower than the gel-forming temperature of the mixture, onto a roll having a temperature $\leq 100°$ C., thereby forming the at least one layer in the shape of a film.

20 Claims, 1 Drawing Sheet

METHODS FOR THE PRODUCTION OF FILMS

BACKGROUND OF THE INVENTION

1. Field of the Invention

The present invention relates to a method for the production of films, in particular, optically high-quality, weather- and fracture-resistant protective and decorative films, which contain, in at least one layer, mixtures of fluorine polymers and poly(meth)acrylates. The invention also relates to a method of providing substrates with the polymer film of the invention.

2. Description of the Background

Films which contain mixtures of fluorine polymers and poly(meth)acrylates are widely known in technical circles. In particular, PVDF/PMMA blends have excellent characteristics, which are clearly better than those of the individual components, if these polymers are mixed in the right ratio. Thus, the pronounced crystallinity of the PVDF can be reduced by an addition of at least 25% poly(meth)acrylate to a degree which no longer negatively influences the optical characteristics of the film. The addition of at least 40% PVDF to poly(meth)acrylate leads to a clear increase in chemical resistance of the film. If at least 55% PVDF is added, then the low-temperature tenacity is, over and above that, also improved.

Up to now, films made of these mixtures have been either cast from organic solution onto carrier films or extrusion-coated on carrier films as a melt.

The first method incurs high investment costs, since the solvents needed, such as N-methylpyrrolidone, impose a significant environmental hazard. Therefore, a release of these solvents into the surrounding environment must be avoided to the greatest extent possible. Moreover, the rates at which the films can be produced by this method are relatively low. Therefore, this method is, as a whole, very expensive.

A second way to produce these films is to extrude a film onto a carrier film, as is described in World Patent No. 96/40480. The disadvantage in this method is that the carrier film must possess a relatively high heat resistance, since otherwise, it is deformed by the hot melt, as is described, for example, in Example 2 of World Patent No. 96/40480. Accordingly, one cannot dispense with the use of relatively expensive carrier films in the production of multilayer PVDF/PMMA films. In the production of monolayer PVDF/PMMA films, this method is, moreover, expensive, since the carrier layer must be removed. Moreover, the carrier layer is joined with the PVDF/PMMA when hot. This results in additional disadvantages. In particular, the haze values are impaired by this measure.

Attempts to produce PVDF/PMMA films without a carrier film are known. These films, however, are hazy and do not have the desired surface gloss. A need, therefore, continues to exist for a method of preparing improved PVDF/PMMA films.

SUMMARY OF THE INVENTION

Accordingly, one object of the present invention is to provide a method of producing films which contain at least one layer of mixtures of fluorine polymers and poly(meth)acrylates and with which monolayer fluorine polymer- and poly(meth)acrylate-containing, optically high-quality, weather- and fracture-resistant films can be produced, without having to use solvents or having to coat carrier films when hot.

Another object of the invention is to provide as low-cost a method as possible of producing such polymer films.

Still another object of the invention is to provide a solvent-free method in which films with a particularly low haze, which contain at least one layer of poly(meth)acrylate and fluorine polymers, are produced.

Yet another object of the present invention is to provide a method for the production of films of the above type, which make possible high web travel rates.

Briefly, these objects and other objects of the present invention as hereinafter will become more readily apparent can be attained by a method of producing films containing at least one layer of fluorine polymers and poly(meth)acrylates comprising (i) preparing a mixture of fluorine polymer and poly(meth)acrylate; and (ii) extruding the mixture maintained below its gel-forming temperature through the die of an extruder having a filter placed before entry of the mixture into the die, the temperature of the die being maintained higher than the temperature of the composition upon entry into the die but lower than the gel-forming temperature of the mixture, onto a roll having a temperature $\leq 100°$ C., thereby forming said at least one layer in the shape of a film.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
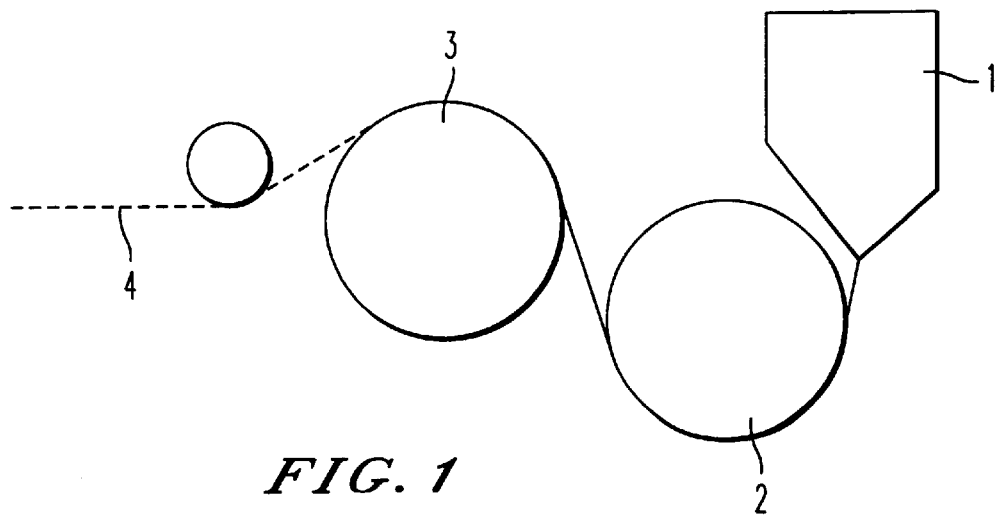
FIG. 1 is a schematic representation showing extrusion of polymer mixture for the production of films.

In the present process a dry mixture containing poly(meth)acrylate and fluorine polymers is first prepared in order to produce a film which contains at least one layer of fluorine polymers and poly(meth)acrylates. This mixture is shaped into a film by extrusion onto a roll which has a temperature $\leq 100°$ C., preferably $\leq 70°$ C. The temperature of the mixture is kept below the gel-forming temperature of the mixture. A filter is placed before the entry to the die of the extruder through which the mixture is extruded. The die temperature is kept higher than the temperature of the composition, but upon entry into the die, the temperature is kept lower than-the gel-forming temperature. It is, therefore, possible to provide, in an unforeseeable manner, a method by which a film containing a monolayer of a fluorine polymer and poly(meth)acrylate is prepared of high, optical quality and weather- and fracture-resistance, without having to use a solvent or without having to coat a carrier film when hot.

Among others, the following are advantages attained by the method of the invention:

i) The present invention can be conducted with commercially obtainable units.

ii) High web travel rates are possible.

iii) The films produced by the method of the invention have an excellent surface gloss and a low haze.

iv) The films produced according to the invention can be laminated with other films, in-line, at room temperature.

v) If the product film is to be provided with a coated layer, the coated layer can be made from low-cost polymers, depending on the application, since these laminating polymer films are not subject to any thermal stress during production.

Within the framework of the invention under consideration, "fluorine polymers" are understood to mean those which can be obtained by the radical polymerization of ethylenically unsaturated monomers, on whose double bond there is at least one fluorine substituent. Copolymers containing units of the fluorine containing monomer are also included here. In addition to one or more fluorine-containing monomers, the copolymers can contain other monomers which can be copolymerized with these fluorine-containing monomers.

Suitable fluorine-containing monomers include chlorotrifluoroethylene, fluorovinylsulfonic acid, hexafluoroisobutylene, hexafluoropropylene, perfluorovinylmethylether, tetrafluoroethylene, vinyl fluoride, vinylidene fluoride, and the like. Of these, vinylidene fluoride is particularly preferred.

It is important for the invention under consideration that the fluorine-containing polymer can be extruded into films. Accordingly, the molecular weight can vary within wide ranges, if auxiliaries or copolymers are used. In general, the weight average molecular weight of the fluorine-containing polymers is in the range of 100,000–200,000, preferably in the range of 110,000–170,000, without a limitation resulting hereby.

The poly(meth)acrylate component includes polymeric esters of acrylic acid and methacrylic acid and mixtures of these polymers or copolymers of acrylates and methacrylates. These are polymers which can be prepared by the radical polymerization of (meth)acrylates monomers. These polymers also comprise copolymers of a (meth)acrylate with other monomers. Suitable such (meth)acrylate monomers include methyl methacrylate, methyl acrylate, ethyl methacrylate, ethyl acrylate, propyl methacrylate, propyl acrylate, n-butyl methacrylate, tert-butyl methacrylate, isobutyl methacrylate, hexyl methacrylate, hexyl acrylate, cyclohexyl methacrylate, cyclohexyl acrylate, benzyl methacrylate, and benzyl acrylate.

Suitable copolymerizable monomers include vinyl chloride, vinylidene chloride, vinyl acetate, styrene, substituted styrenes with an alkyl substituent in the side chain such as α-methylstyrene and α-ethylstyrene, substituted styrenes with an alkyl substituent on the ring, such as vinyl toluene and p-methylstyrene, halogenated styrenes such as monochlorostyrenes, dichlorostyrenes, tribromostyrenes, and tetrabromostyrenes, vinyl and isopropenyl ethers, maleic acid derivatives such as maleic acid anhydride, methyl maleic acid anhydride, maleinimide, methyl maleinimide, and dienes such as 1,3-butadiene and divinylbenzene. Particularly preferred are poly(meth)acrylates which contain methyl(meth)acrylate.

The molecular weight of the poly(meth)acrylates can vary within wide ranges. It is essential that the polymer can be extruded to films. Accordingly, polymers with a high molecular weight are also extruded to films by varying the copolymer fraction and by adding auxiliaries, such as plasticizers. In general, the weight average molecular weight of the poly(meth)acrylates, however, preferably resides in the range of 30,000–300,000 and particularly preferably in the range of 80,000–250,000.

The production of the above fluorine polymers and poly(meth)acrylates to be used in the invention can be prepared by various methods of radical polymerization, known in the art. Thus, the polymers can be produced by bulk, solution, suspension, or emulsion polymerization. Bulk polymerization is described, for example, in Houben-Weyl, Volume E20, Part 2 (1987), p. 1145 ff. Valuable instructions regarding solution polymerization can be found on p. 1156 ff. Explanations of suspension polymerization technology can also be found on p. 1149 ff, whereas emulsion polymerization is also presented and explained on p. 1150 ff.

In general, the fluorine polymers, the poly(meth)acrylates, and the above described starting monomers can be obtained commercially.

Particularly preferred mixtures contain 10–90 wt. %, in particular, 40–75 wt. % polyvinylidene fluoride (PVDF), and 90–10 wt. %, in particular, 60–25 wt. % polymethyl methacrylate (PMMA). These percentage values are based on the total weight of the mixture. Very particularly preferred PMMA contains a comonomer fraction of up to approximately 20 wt. %, based on the quantity of PMMA, such as butyl methacrylate or methyl acrylate, which improve processability. The preferred PVDF can be used as a homopolymer and/or copolymer.

The extrudable polymer mixtures can contain other polymers, which can be mixed both with fluorine polymers and with the poly(meth)acrylates. Suitable such polymers include polycarbonates, polyesters, polyamides, polyimides, polyurethanes, polyethers and the like Miscibility of the various substances means that the components form a homogenous mixture which does not have any haze that can be attributed to phase separation. Moreover, the films can contain additives which are widely known in technical circles. Suitable such additives include antistatics, antioxidants, dyes, flame retardant agents, fillers, light stabilizers, and organic phosphorus compounds, such as phosphates or phosphonates, pigments, anti-weathering agents, and plasticizers.

All known UV absorbers can be used in accordance with the invention. Particularly preferred are UV absorbers of the benzotriazole and hydroxyphenyl-triazine types. Very particularly preferred are UV absorbers which are triazine-based compounds. These UV absorbers are durable and stable with respect to weathering. Moreover, they have excellent absorption characteristics.

In accordance with the invention, a mixture, preferably a dry mixture or melt mixture, which contains at least one poly(meth)acrylate and a fluorine polymer, is first produced for the production of films.

The mixing can take place in conventional apparatuses widely known for this purpose. The temperature at which the mixing takes place lies below the gel temperature of the mixture.

The resulting mixture is extruded on a roll, which has a temperature ≦100° C., preferably ≦70° C., to form a film. The extruding of polymer to films is widely known and is described, for example, in Plastic Extrusion Technology II, Hanser Verlag, 1986, p. 125 ff. Schematically, this extrusion device is shown in FIG. 1. The hot melt moves from the die of the extruder 1 onto a chill roll 2. Extrusion with chill rolls is widely known in technical circles, and such rolls have to be finished for a high gloss pruduct. In the present method, rolls other than chill rolls can also be used. Another roll 3 first takes up the melt cooled on roll 2, wherein a monolayer film 4 is obtained, which can be provided with other layers.

In order to keep the film being formed largely free of impurities, a filter is brought into place before the entry of the melt into the die. The mesh width of the filter is generally based on the substances used and can, accordingly, vary within wide ranges. In general, however, mesh widths lie in the range of 300–20 μm. Filters with several screens of different mesh widths can be placed before the die entry. These filters are widely known in technical circles and are commercially obtainable. The appended Examples serve as a further reference point for the specialist.

In order to obtain films with high quality, it is, moreover, advantageous to use particularly pure raw materials.

PVDF increasingly forms gels (manufacturer's information from the Solvay Company) at temperatures above approximately 240° C. These gel particles can be removed by filtering only with relative difficulty. Accordingly, it is necessary to avoid a possible gel formation. Therefore, the extrusion is carried out at temperatures which are as far below the gel formation temperature as possible. For the production of films low in gel particles there are also powdery PVDF supply forms whose average particle size is, for example, 0.2 mm. They are more completely opened up in the shearing field of the extruder.

However, the temperature must be high enough so that the mixture can be extruded to a film which has excellent surface quality and as low as possible a haze. The preferred temperature is, for example, dependent on the composition of the mixture and can, therefore, vary within wide ranges. However, preferred temperatures of the mixture up to the die entry lie in the range of 150–210° C., particularly preferred in the range of 180–200° C. Here, the temperature of the mixture over the entire shaping process must be maintained below the gel formation temperature.

The thickness of the film can vary over a large range, which is generally dependent on the desired application purpose. Frequently selected film thicknesses lie in the range of 10–200 μm. The film thickness can be adjusted via parameters which are known to the specialist.

The pressure with which the melted mixture is pressured into the die can, for example, be controlled by the speed of the screw. The pressure generally resides in the range of 40–100 bar. However, the present method is not particularly limited to a particular pressure range. The rate at which the films can be obtained in the invention is accordingly greater than 5 m/s, in particular, greater than 10 m/s, without the present process being particularly limited to such rates. One of skill in the art can receive additional information of general process parameters by means of the Examples which follow.

In order for the obtained film to have a high surface quality and a low haze, it is essential that the temperature of the die be selected higher than the temperature of the mixture before entering the die, but lower than the gel formation temperature.

Preferably, the die temperature is set to 5%, with particular preference 10%, and with very particular preference, 15% higher than the temperature of the mixture before entering the die. Accordingly, preferred temperatures of the nozzle lie in the range of 160–235° C., particularly preferably 200–230° C., and very particularly preferably 210–220° C.

After the film is obtained, it can be laminated with another film. These films are used to protect the PVDF/PMMA-containing layer from damage during the subsequent processing steps. Moreover, a further processing of the films can be facilitated in this way.

Particularly preferred are these layers which can be applied on the PVDF/PMMA-containing layer for protection, among others, layers made of polyesters such as polybutylene terephthalate (PBT), polyethylene terephthalate (PET), and/or polyolefins such as polyvinyl chloride (PVC), polypropylene (PP), polyethylene (PE) and the like.

The PVPF/PMMA-containing films can also be provided with pigments or imprinted with dyes. It is also possible to attain metallic effects on these films. These processes are known to one skilled in the art and include, for instance, gravure printing, gravure coating, and micro-gravure coating.

Other layers, in turn, can be applied, which can serve to improve the adhesion of the subsequently applied polymer, to this layer provided with decorations or other ornamentations.

The application of these layers can be carried out by co-laminating at elevated temperatures. These methods are widely known in technical circles and are described, for example, in Plastic Extrusion Technology II, Hanser Verlag, 1986, p. 320 ff.

Preferred as layers are polyesters such as polybutylene terephthalate (PBT), polyethylene terephthalate (PET), and polyolefins, such as polyvinyl chloride (PVC), polypropylene (PP), polyethylene (PE), acrylonitrile-butadiene-styrene copolymers (ABS), acrylonitrile-styrene-acrylic ester copolymers (ASA), polycarbonate (PC), and polyamides (PA), and mixtures of these polymers.

It is obvious to one of skill in the art that these layers can be brought together to form multilayer films in various arrangements. Such a film can, accordingly, have several decorative layers/printed layers in various sequences. Moreover, multilayer films can also contain adhesive layers, which can be used both to join layers made of different plastics and also to affix the films to the objects to be protected.

Figure 2:
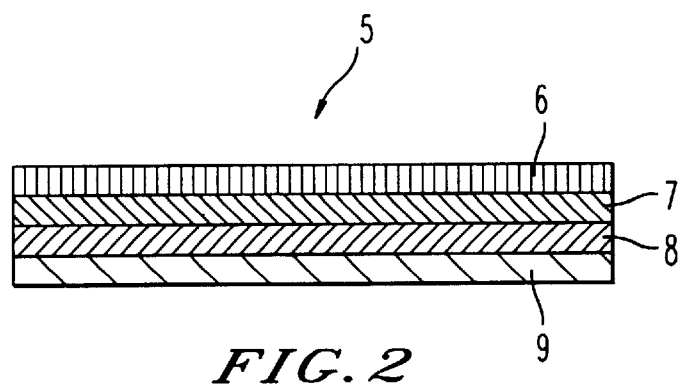
FIG. 2 shows the layered structure of a special specific embodiment of a film which can be produced in the invention.

A special specific embodiment of such a multilayer film 5 is, for example, shown in FIG. 2.

In FIGS. 2, 6 designates a protective layer, which protects the surface of the PVDF/PMMA-containing layer 7 from damage during the processing. The protective layer 6 generally has a thickness in the range of 10–100 μm. Layer 8 designates a decorative layer which, for example, is formed by pigment application on layer 7, wherein these pigments can be applied, for example, by the offset printing process or also by the intaglio printing process. The decorative layer comprises films also, which can be obtained commercially for this purpose and can be added by co-laminating.

As is shown in FIG. 2, a substrate layer 9 can be placed on this layer 8. This layer can also be used to increase compatibility with a resin, which is applied on this substrate layer in a subsequent process. Carrier layers for this purpose generally have a thickness in the range of 100–1200, preferably 400–600 μm.

Figure 3:
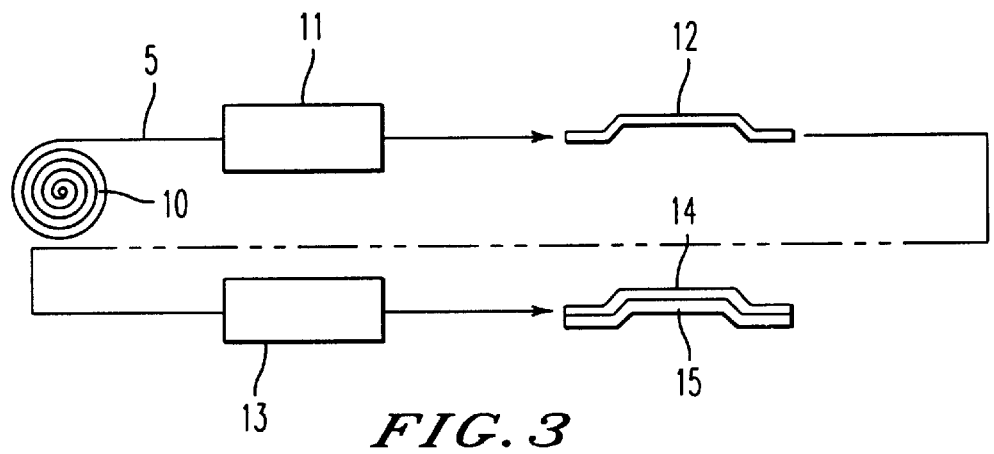
FIG. 3 shows the further processing of a film produced by the method of the invention under consideration, in an injection molding process.

A roll 10 is obtained, from which inserts are thermoformed in an in-line process, which can be further processed in special injection molding apparatuses. This is schematically depicted in FIG. 3. The roll 10 is unrolled in an apparatus provided for the purpose, wherein, for example, the multilayer film 5 depicted in FIG. 2 is transferred to a thermoforming machine 11. Inserts 12, which are placed in a mold for the in mold film decoration process? in a special injection molding machine 13, are made from the multilayer film in the thermoforming machine. The resin is applied on the substrate layer. The protective layer 6 of the multilayer film 5 shown in—FIG. 2 does not come into contact with the injection molding resin, but rather is adjacent to the injection mold. In this way, an injection-molded part 15 is obtained, which is equipped with an excellently adhering, UV-resistant decorative exterior 14.

The protective layer 6, an the decorative exterior 14, if a multilayer film 5 which is depicted in FIG. 2, is used, can be removed after the of the installation part 15. In this way, a surface with an excellent quality is obtained.

Among other things, construction and accessory parts for motor vehicles such as instrument boards, middle consoles, door frame linings, spoilers, and mudguards, can be produced in this manner.

The substrate layer 9 depicted in FIG. 2 can also be used to protect the decorative layer, wherein an adhesive layer can be applied, for example, on the exterior of the substrate layer 9, so that self-adhesive decorative films are obtained, which have, in addition to an excellent surface quality, an outstanding durability. These decorative films can be used, among other areas, in the automobile industry also.

Moreover, the films obtained by the present invention can be used as weather-protective and decorative films for window profiles, yard furniture, doors, balustrades, building coverings, covers for solar batteries, sheathings of interior parts of airplanes and roofing elements.

Having now generally described the invention, a further understanding can be obtained by reference to certain specific examples which are provided herein for purpose of illustration only and are not intended to be limiting unless otherwise specified.

EXAMPLE 1

A 27.8 kg amount of ®Solef 1010 from Solvay, 11.9 kg ®Plexiglas 8N from the Roehm Company, and 0.32 kg UV-absorbers (®Mark LA 31, obtained from the Palmarole Company, Basel) were mixed in a tumbling mixer at a temperature of 25° C. The dry mixture thus obtained was extruded into a film in an extruder from the Breyer Company. The dry mixture obtained was melted at a temperature of approximately 195° C. (temperature profile: $v_1$=135° C.; $v_2$=$v_{3-10}$=190° C.; $v_{melt\ pump}$=200° C.; and $v_{die}$=220° C.). The melted mixture was extruded under a pressure of 40 bar, wherein the screw was operated with a die rotation speed of 13 rpm. A Gneuss filter with a mesh width of 40 $\mu$m was placed before the die entry. The die temperature was set at 220° C. The distance between the die and the roll was 3 mm. The temperature of the roll which was polished to a mirror-bright gloss was 24° C.

The film was produced at a rate of 14 m/s. The film thus obtained was investigated with regard to its quality.

The haze was determined according to ASTM-D 1003. The modulus of elasticity, the tensile strength and the elongation at tear were determined according to ISO 527-312.

Gel particles are defective sites which are recognizable in particular, with enlargement, and flash dark/light when the film is moved back and forth. To determine these defective sites, a particle counting apparatus COPEX LP 3 from the AGFA-GAEVERT was used.

Moreover, the resistance of the film with respect to various chemicals was investigated. To this end, a wad of cotton was saturated with the solvent which is indicated in Table I (gasoline (carburetor fuel, unleaded); acetone; ethanol/water 70/30 mixture (volume-percent)), wherein the wad of cotton was immersed in the solvent and the excess solvent was drained, without the wad of cotton being squeezed.

The wad of cotton treated in this manner was placed on the film sample and covered with an inverted watch glass. The sample size was 5×5 am in each case. After 48 hours, the film sample was removed and examined visually for changes in gloss and surface characteristics.

If no visible changes appeared, then the sample was classified as resistant. If slight changes appeared, then the sample was conditionally resistant. If great changes appeared, then the sample was not resistant.

The measurement values and the evaluation with respect to chemical resistance are given in Table 1.

EXAMPLE 2

Example 1 was essentially repeated, except that 6 kg Solef® 1010 from Solvay, 4 kg Plexiglas® 8N from Roehm GmbH were used instead of the quantities of these polymers indicated in Example 1, wherein the weight percentage of the UV-absorber, based on the total weight, was maintained constant.

The experimental results obtained are presented in Table 1.

EXAMPLE 3

Example 1 was essentially repeated, except that 3 kg Plexiglas® 6N from Roehm GmbH, instead of the Plexiglas® 8N used in Example 1, wherein the weight percentage of the UV-absorber, based on the total weight, was maintained constant.

The experimental results obtained are also given in Table 1.

EXAMPLE 4

Example 1 was essentially repeated, except that 7 kg Solef® 6012 from Solvay, instead of the Solef® 1010 used in Example 1, were used, wherein the weight percentage of the UV-absorber, based on the total weight, was maintained constant.

The experimental result as obtained are also presented in Table 1.

Comparative Experiment 1

The experiment described in Example 1 was repeated, except that the melt and the die were increased, in each case, to 245° C.

The experimental results obtained are also presented in Table 1, wherein the total number of gel particles rose to four times the amount.

Comparative Experiment 2

The experiment described in Example 1 was repeated, except that the melt and the die were decreased, in each case, to 180° C.

The experimental results obtained are also presented in Table 1, wherein the haze value rose in a more proportional manner.

| | Example 1 | Example 2 | Example 3 | Example 4 | Comparative Example 1 | Comparative Example 2 |
|---|---|---|---|---|---|---|
| Haze (%) | 1.5 | 1.5 | 1.4 | 3.5 | 0.9 | 4.4 |
| E-modulus (mpa) | 970 | 850 | 1020 | 930 | 795 | 690 |
| Tensile strength (mpa) | 45 | 42 | 38 | 41 | 46 | 42 |
| Breaking Elongation (%) | 306 | 300 | 282 | 285 | 380 | 300 |
| No. of Gel Particles | low | low | low | low | high | low |
| Gasoline | resistant | resistant | resistant | resistant | resistant | resistant |
| Acetone | resistant | resistant | resistant | resistant | resistant | resistant |
| Ethanol/water | resistant | resistant | resistant | resistant | resistant | resistant |

The disclosure of a German priority application filed Dec. 22, 1998 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A method for the production of films containing at least one layer of fluorine polymers and poly(meth)acrylates, comprising:
   (i) preparing a mixture of fluorine polymer and poly(meth)acrylate; and
   (ii) extruding the mixture maintained below its gel-forming temperature through the die of an extruder having a filter placed before entry of the mixture into the die, the temperature of the die being maintained higher than the temperature of the composition upon entry into the die but lower than the gel-forming temperature of the mixture, onto a roll having a temperature $\leq 100°$ C., thereby forming said at least one layer in the shape of a film.

2. The method of claim 1, wherein said mixture of polymers comprises 10–90 wt. % PVDF and 90–10 wt. % PMMA.

3. The method of claim 2, wherein said mixture of polymers comprises 40–75 wt. % PVDF and 60–25 wt. % PMMA.

4. The method of claim 1, wherein the temperature of the polymer mixture before entering the die is in the range of 150–210° C.

5. The method of claim 4, wherein the temperature of the polymer mixture before entering the die is in the range of 180–200° C.

6. The method of claim 1, wherein the weight average molecular weight of the fluorine polymer is 100,000–200,000.

7. The method of claim 6, wherein the weight average molecular weight of the fluorine polymer is 110,000–170,000.

8. The method of claim 1, wherein the fluorine polymer is comprised of at least one monomer selected from the group consisting of chlorotrifluoroethylene, fluorovinylsulfonic acid, hexafluoroisobutylene, hexafluoropropylene, perfluorovinylmethylether, tetrafluoroethylene, vinyl fluoride and vinylidene fluoride.

9. The method of claim 1, wherein the weight average molecular weight of the poly(meth)acrylate is 30,000–300,000.

10. The method of claim 9, wherein the weight average molecular weight of the poly(meth)acrylate is 80,000–250,000.

11. The method of claim 1, wherein the poly(meth)acrylate is comprised of at least one monomer selected from the group consisting of methyl methacrylate, methyl acrylate, ethyl methacrylate, ethyl acrylate, propyl methacrylate, propyl acrylate, n-butyl methacrylate, tert-butyl methacrylate, isobutyl methacrylate, hexyl methacrylate, hexyl acrylate, cyclohexyl methacrylate, cyclohexyl acrylate, benzyl methacrylate and benzyl acrylate.

12. The method of claim 1, wherein the mixture of polymers contains a UV absorber.

13. The method of claim 12, wherein said UV absorber is benzonitrile or hydroxyphenyltriazine.

14. The method of claim 1, which further comprises applying a protective film, in-line, to said film at room temperature.

15. The method of claim 1, wherein the protective film is of a polyester, a polyolefin or a combination thereof.

16. The method of claim 1, wherein the film thickness ranges from 10–200 $\mu$m.

17. The method of claim 1, wherein the temperature of the roll is $\leq 70°$ C.

18. A polymer film containing at least one layer of fluorine polymers and poly(meth)acrylates, prepared by a process comprising:
   (i) preparing a mixture of fluorine polymer and poly(meth)acrylate; and
   (ii) extruding the mixture maintained below its gel-forming temperature through the nozzle of an extruder having a filter placed before entry of the mixture into the nozzle, the temperature of the nozzle being maintained higher than the temperature of the composition upon entry into the nozzle but lower than the gel-forming temperature of the mixture, onto a roll having a temperature $\leq 100°$ C., thereby forming said at least one layer in the shape of a film.

19. A method of covering solar batteries, sheathing interior parts of aircraft and providing roofing elements, comprising:
   incorporating the polymer film of claim 18 into said solar batteries, aircraft parts and roofing elements.

20. A method of weather-protecting and decorating yard furniture, window profiles, doors, balustrades, building panels and construction and accessory parts of motor vehicles, comprising:
   coating said yard furniture, window profiles, doors, balustrades, building panels and construction and accessory parts of motor vehicles with the polymer film of claim 18.

* * * * *

UNITED STATES PATENT AND TRADEMARK OFFICE
CERTIFICATE OF CORRECTION

PATENT NO.    : 6,420,033 B1
DATED         : July 16, 2002
INVENTOR(S)   : Uwe Numrich et al.

It is certified that error appears in the above-identified patent and that said Letters Patent is hereby corrected as shown below:

<u>Column 10,</u>
Line 29, "benzonitrile" should read -- benzotriazole --.

Signed and Sealed this

Fifteenth Day of April, 2003

JAMES E. ROGAN
*Director of the United States Patent and Trademark Office*